US009344754B2

(12) United States Patent
Briggs et al.

(10) Patent No.: US 9,344,754 B2
(45) Date of Patent: *May 17, 2016

(54) INTERACTIVE PRODUCT PLACEMENT SYSTEM AND METHOD THEREFOR

(71) Applicant: Cinsay, Inc., Dallas, TX (US)

(72) Inventors: Christian Briggs, Austin, TX (US); Heath McBurnett, Aliso Viejo, CA (US); Delfino Galindo, Jr., Laguna Niguel, CA (US); Freddy Knuth, Euless, TX (US)

(73) Assignee: Cinsay, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/808,845

(22) Filed: Jul. 24, 2015

(65) Prior Publication Data

US 2016/0029073 A1    Jan. 28, 2016

Related U.S. Application Data

(63) Continuation of application No. 14/292,423, filed on May 30, 2014, which is a continuation of application No. 14/042,477, filed on Sep. 30, 2013, now Pat. No. 8,782,690, which is a continuation of application No. 13/762,184, filed on Feb. 7, 2013, now Pat. No. 8,549,555, which is a continuation of application No. 13/605,892, filed on Sep. 6, 2012, now Pat. No. 8,533,753, which is a continuation of application No. 12/363,713, filed on Jan. 30, 2009, now Pat. No. 8,312,486.

(60) Provisional application No. 61/024,829, filed on Jan. 30, 2008.

(51) Int. Cl.
*H04N 7/025* (2006.01)
*H04N 21/431* (2011.01)
*H04N 21/435* (2011.01)
*H04N 21/4725* (2011.01)
(Continued)

(52) U.S. Cl.
CPC ......... *H04N 21/4316* (2013.01); *H04N 21/237* (2013.01); *H04N 21/2542* (2013.01); *H04N 21/26603* (2013.01); *H04N 21/435* (2013.01); *H04N 21/4722* (2013.01); *H04N 21/4725* (2013.01); *H04N 21/812* (2013.01); *H04N 21/8133* (2013.01); *H04N 21/8455* (2013.01); *H04N 21/858* (2013.01); *H04N 21/8545* (2013.01)

(58) Field of Classification Search
USPC ...................................................... 725/32–36
See application file for complete search history.

(56) References Cited

U.S. PATENT DOCUMENTS

| 5,264,933 A | 11/1993 | Rosser et al. |
| 5,600,775 A | 2/1997 | King et al. |

(Continued)

FOREIGN PATENT DOCUMENTS

| CN | 101286253 | 10/2008 |
| CN | 101647035 | 2/2010 |

(Continued)

OTHER PUBLICATIONS

Decision of Grant of a Patent for Invention for Russian Patent Application No. 2012105917/08, dated Jan. 11, 2016.

(Continued)

*Primary Examiner* — Nicholas Corbo

(57) ABSTRACT

A method for presenting advertisements for commercial products in video productions, whereby the commercial product is placed in the video production as an element of the video production. A viewer is enabled to interact with the video production to select the product. Information is then displayed about the selected product; and the viewer is enabled to purchase the selected product.

25 Claims, 6 Drawing Sheets

(51) Int. Cl.
*H04N 21/81* (2011.01)
*H04N 21/4722* (2011.01)
*H04N 21/237* (2011.01)
*H04N 21/254* (2011.01)
*H04N 21/266* (2011.01)
*H04N 21/858* (2011.01)
*H04N 21/845* (2011.01)
*H04N 21/8545* (2011.01)

(56) References Cited

U.S. PATENT DOCUMENTS

| | | |
|---|---|---|
| 5,675,511 A | 10/1997 | Prasad et al. |
| 5,774,664 A | 6/1998 | Hidary et al. |
| 5,778,181 A | 7/1998 | Hidary et al. |
| 5,903,816 A | 5/1999 | Broadwin et al. |
| 5,929,849 A | 7/1999 | Kikinis |
| 6,006,257 A | 12/1999 | Slezak |
| 6,009,410 A | 12/1999 | LeMole et al. |
| 6,014,638 A | 1/2000 | Burge et al. |
| 6,018,768 A | 1/2000 | Ullman et al. |
| 6,058,430 A | 5/2000 | Kaplan |
| 6,141,060 A | 10/2000 | Honey et al. |
| 6,154,771 A | 11/2000 | Rangan et al. |
| 6,169,573 B1 | 1/2001 | Sampath-Kumar et al. |
| 6,173,317 B1 | 1/2001 | Chaddha et al. |
| 6,182,116 B1 | 1/2001 | Namma et al. |
| 6,188,398 B1 | 2/2001 | Collins-Rector et al. |
| 6,233,682 B1 | 5/2001 | Fritsch |
| 6,240,555 B1 | 5/2001 | Shoff et al. |
| 6,263,505 B1 | 7/2001 | Walker et al. |
| 6,275,989 B1 | 8/2001 | Broadwin et al. |
| 6,282,713 B1 | 8/2001 | Kitsukawa et al. |
| 6,321,209 B1 | 11/2001 | Pasquali |
| 6,330,595 B1 | 12/2001 | Ullman et al. |
| 6,357,042 B2 | 3/2002 | Srinivasan et al. |
| 6,496,981 B1 | 12/2002 | Wistendahl et al. |
| 6,510,557 B1 | 1/2003 | Thrift |
| 6,536,041 B1 | 3/2003 | Knudson et al. |
| 6,553,566 B1 | 4/2003 | Grant et al. |
| 6,564,380 B1 | 5/2003 | Murphy |
| 6,628,307 B1 | 9/2003 | Fair |
| 6,757,906 B1 | 6/2004 | Look et al. |
| 6,766,528 B1 | 7/2004 | Kim et al. |
| 6,792,618 B1 | 9/2004 | Bendinelli et al. |
| 6,847,778 B1 | 1/2005 | Vallone et al. |
| 6,857,010 B1 | 2/2005 | Cuijpers et al. |
| 6,910,049 B2 | 6/2005 | Fenton et al. |
| 6,912,726 B1 | 6/2005 | Chen et al. |
| 6,941,575 B2 | 9/2005 | Allen |
| 6,976,028 B2 | 12/2005 | Fenton et al. |
| 6,990,498 B2 | 1/2006 | Fenton et al. |
| 7,000,242 B1 | 2/2006 | Haber |
| 7,017,173 B1 | 3/2006 | Armstrong et al. |
| 7,072,683 B2 | 7/2006 | King et al. |
| 7,076,792 B2 | 7/2006 | Zigmond et al. |
| 7,120,871 B1 | 10/2006 | Harrington |
| 7,133,837 B1 | 11/2006 | Barnes, Jr. |
| 7,136,853 B1 | 11/2006 | Kohda et al. |
| 7,146,631 B1 | 12/2006 | Tanaka et al. |
| 7,158,676 B1 | 1/2007 | Rainsford |
| 7,162,263 B2 | 1/2007 | King et al. |
| 7,168,051 B2 | 1/2007 | Robinson et al. |
| 7,168,087 B2 | 1/2007 | Goldberg et al. |
| 7,188,186 B1 | 3/2007 | Meyer et al. |
| 7,203,909 B1 | 4/2007 | Horvitz et al. |
| 7,207,057 B1 | 4/2007 | Rowe |
| 7,222,163 B1 | 5/2007 | Girouard et al. |
| 7,231,651 B2 | 6/2007 | Pong |
| 7,243,139 B2 | 7/2007 | Ullman et al. |
| 7,254,622 B2 | 8/2007 | Nomura et al. |
| 7,257,774 B2 | 8/2007 | Denoue et al. |
| 7,269,837 B1 | 9/2007 | Redling et al. |
| 7,331,057 B2 | 2/2008 | Eldering et al. |
| 7,353,186 B2 | 4/2008 | Kobayashi |
| 7,355,633 B2 | 4/2008 | Kurosawa et al. |
| 7,409,437 B2 | 8/2008 | Ullman et al. |
| 7,412,406 B2 | 8/2008 | Rosenberg |
| 7,432,768 B2 | 10/2008 | Han et al. |
| 7,444,659 B2 | 10/2008 | Lemmons |
| 7,464,344 B1 | 12/2008 | Carmichael et al. |
| 7,485,397 B2 | 2/2009 | Eck et al. |
| 7,487,112 B2 | 2/2009 | Barnes, Jr. |
| 7,509,340 B2 | 3/2009 | Fenton et al. |
| 7,539,738 B2 | 5/2009 | Stuckman et al. |
| 7,559,017 B2 | 7/2009 | Datar et al. |
| 7,559,034 B1 | 7/2009 | Paperny et al. |
| 7,574,381 B1 | 8/2009 | Lin-Hendel |
| 7,577,978 B1 | 8/2009 | Wistendahl et al. |
| 7,593,965 B2 | 9/2009 | Gabriel |
| 7,600,241 B2 | 10/2009 | Zigmond et al. |
| 7,607,107 B2 | 10/2009 | Iten et al. |
| 7,613,691 B2 | 11/2009 | Finch |
| 7,614,013 B2 | 11/2009 | Dollar et al. |
| 7,620,914 B2 | 11/2009 | Li et al. |
| 7,624,416 B1 | 11/2009 | Vandermolen et al. |
| 7,631,327 B2 | 12/2009 | Dempski et al. |
| 7,653,923 B2 | 1/2010 | Flickinger |
| 7,661,121 B2 | 2/2010 | Smith et al. |
| 7,664,678 B1 | 2/2010 | Haber |
| 7,673,017 B2 | 3/2010 | Kim et al. |
| 7,691,666 B2 | 4/2010 | Levy et al. |
| 7,698,178 B2 | 4/2010 | Chu |
| 7,721,307 B2 | 5/2010 | Hendricks et al. |
| 7,735,101 B2 | 6/2010 | Lanza et al. |
| 7,739,596 B2 | 6/2010 | Clarke-Martin et al. |
| 7,750,343 B2 | 7/2010 | Choi et al. |
| 7,756,758 B2 | 7/2010 | Johnson et al. |
| 7,769,827 B2 | 8/2010 | Girouard et al. |
| 7,769,830 B2 | 8/2010 | Stuckman et al. |
| 7,773,093 B2 | 8/2010 | Bates et al. |
| 7,774,161 B2 | 8/2010 | Tischer |
| 7,774,815 B1 | 8/2010 | Allen |
| 7,800,102 B2 | 9/2010 | Park et al. |
| 7,804,506 B2 | 9/2010 | Bates et al. |
| 7,818,763 B2 | 10/2010 | Sie et al. |
| 7,823,058 B2 | 10/2010 | Pea et al. |
| 7,840,415 B2 | 11/2010 | Schifone |
| 7,870,592 B2 | 1/2011 | Hudson et al. |
| 7,885,951 B1 | 2/2011 | Rothschild |
| 7,899,719 B2 | 3/2011 | Lin-Hendel |
| 7,912,753 B2 | 3/2011 | Struble |
| 7,923,722 B2 | 4/2011 | Ryu et al. |
| 7,925,973 B2 | 4/2011 | Allaire et al. |
| 7,946,492 B2 | 5/2011 | Rohs |
| 7,975,020 B1 | 7/2011 | Green et al. |
| 7,975,062 B2 | 7/2011 | Krikorian et al. |
| 7,979,877 B2 | 7/2011 | Huber et al. |
| 7,982,216 B2 | 7/2011 | Imai |
| 7,987,098 B2 | 7/2011 | Schifone |
| 7,987,483 B1 | 7/2011 | Des Jardins |
| 8,001,116 B2 | 8/2011 | Cope |
| 8,001,577 B2 | 8/2011 | Fries |
| 8,006,265 B2 | 8/2011 | Redling et al. |
| 8,010,408 B2 | 8/2011 | Rubinstein et al. |
| 8,032,421 B1 | 10/2011 | Ho et al. |
| 8,055,688 B2 | 11/2011 | Giblin |
| 8,091,103 B2 | 1/2012 | Cope |
| 8,108,257 B2 | 1/2012 | Sengamedu |
| 8,112,702 B2 | 2/2012 | Badoiu et al. |
| 8,113,844 B2 | 2/2012 | Huang et al. |
| 8,117,281 B2 | 2/2012 | Robinson et al. |
| 8,122,480 B2 | 2/2012 | Sholtis |
| 8,132,486 B1 | 3/2012 | Calvert |
| 8,140,973 B2 | 3/2012 | Sandquist et al. |
| 8,141,112 B2 | 3/2012 | Cope et al. |
| 8,151,182 B2 | 4/2012 | Datar et al. |
| 8,151,295 B1 | 4/2012 | Eldering et al. |
| 8,181,212 B2 | 5/2012 | Sigal |
| 8,196,162 B2 | 6/2012 | van de Klashorst |
| 8,234,218 B2 | 7/2012 | Robinson et al. |
| 8,244,830 B2 | 8/2012 | Robinson et al. |
| 8,310,443 B1 | 11/2012 | Pan |
| 8,312,486 B1 | 11/2012 | Briggs et al. |

(56) References Cited

U.S. PATENT DOCUMENTS

| | | |
|---|---|---|
| 8,316,450 B2 | 11/2012 | Robinson et al. |
| 8,341,152 B1 | 12/2012 | Bates |
| 8,356,077 B2 | 1/2013 | Robinson et al. |
| 8,365,081 B1 | 1/2013 | Amacker et al. |
| 8,413,182 B2 | 4/2013 | Bill |
| 8,433,611 B2 | 4/2013 | Lax et al. |
| 8,438,646 B2 | 5/2013 | Sidi |
| 8,458,053 B1 | 6/2013 | Buron et al. |
| 8,468,562 B2 | 6/2013 | Miller et al. |
| 8,533,753 B2 | 9/2013 | Briggs et al. |
| 8,549,555 B2 | 10/2013 | Briggs et al. |
| 8,615,474 B2 | 12/2013 | Avedissian et al. |
| 8,635,169 B2 | 1/2014 | Avedissian et al. |
| 8,639,621 B1 | 1/2014 | Ellis et al. |
| 8,645,214 B2 | 2/2014 | Hipolito et al. |
| 8,645,217 B2 | 2/2014 | Siegel et al. |
| 8,645,991 B2 | 2/2014 | McIntire et al. |
| 8,655,146 B2 | 2/2014 | Bennett et al. |
| 8,666,818 B2 | 3/2014 | DeVree |
| 8,682,809 B2 | 3/2014 | Avedissian et al. |
| 8,707,185 B2 | 4/2014 | Robinson et al. |
| 8,708,223 B2 | 4/2014 | Gates et al. |
| 8,725,826 B2 | 5/2014 | Robinson et al. |
| 8,745,657 B2 | 6/2014 | Chalozin et al. |
| 8,752,083 B2 | 6/2014 | Geer, III et al. |
| 8,769,016 B2 | 7/2014 | Jakobson |
| 8,769,053 B2 | 7/2014 | Spitz et al. |
| 8,769,584 B2 | 7/2014 | Neumeier et al. |
| 8,782,690 B2 | 7/2014 | Briggs et al. |
| 8,813,118 B2 | 8/2014 | Bhatnagar et al. |
| 8,813,132 B2 | 8/2014 | Andrews, II et al. |
| 8,843,959 B2 | 9/2014 | McMaster et al. |
| 8,893,173 B2 | 11/2014 | Briggs et al. |
| 8,918,804 B2 | 12/2014 | Sinha et al. |
| 9,036,043 B2 | 5/2015 | Segal |
| 2002/0006266 A1 | 1/2002 | Yoon et al. |
| 2002/0007493 A1 | 1/2002 | Butler et al. |
| 2002/0056123 A1 | 5/2002 | Liwerant et al. |
| 2002/0056136 A1 | 5/2002 | Wistendahl et al. |
| 2002/0059196 A1 | 5/2002 | I'Anson et al. |
| 2002/0062481 A1 | 5/2002 | Slaney et al. |
| 2002/0066103 A1 | 5/2002 | Gagnon et al. |
| 2002/0073167 A1 | 6/2002 | Powell et al. |
| 2002/0075332 A1 | 6/2002 | Geilfuss, Jr. et al. |
| 2002/0083447 A1 | 6/2002 | Heron et al. |
| 2002/0083469 A1 | 6/2002 | Jeannin et al. |
| 2002/0087978 A1 | 7/2002 | Nicholson et al. |
| 2002/0112249 A1 | 8/2002 | Hendricks et al. |
| 2002/0126990 A1 | 9/2002 | Rasmussen et al. |
| 2002/0199181 A1 | 12/2002 | Allen |
| 2003/0018966 A1 | 1/2003 | Cook et al. |
| 2003/0023490 A1 | 1/2003 | Lenyon et al. |
| 2003/0028873 A1* | 2/2003 | Lemmons .......... H04N 7/17318 725/36 |
| 2003/0040962 A1 | 2/2003 | Lewis |
| 2003/0055723 A1 | 3/2003 | English |
| 2003/0079224 A1 | 4/2003 | Komar et al. |
| 2003/0084441 A1 | 5/2003 | Hunt |
| 2003/0115598 A1 | 6/2003 | Pantoja |
| 2003/0135563 A1 | 7/2003 | Bodin et al. |
| 2003/0149983 A1 | 8/2003 | Markel |
| 2003/0163832 A1 | 8/2003 | Tsuria et al. |
| 2003/0228615 A1 | 12/2003 | Rossi et al. |
| 2003/0231851 A1 | 12/2003 | Rantala et al. |
| 2004/0012717 A1 | 1/2004 | Sprague et al. |
| 2004/0021684 A1 | 2/2004 | Millner |
| 2004/0021685 A1 | 2/2004 | Denoue et al. |
| 2004/0059783 A1 | 3/2004 | Kazui et al. |
| 2004/0075670 A1 | 4/2004 | Bezine et al. |
| 2004/0080625 A1 | 4/2004 | Kurosawa et al. |
| 2004/0125133 A1 | 7/2004 | Pea et al. |
| 2004/0153385 A1 | 8/2004 | Allibhoy et al. |
| 2005/0005303 A1 | 1/2005 | Barone et al. |
| 2005/0022226 A1 | 1/2005 | Ackley et al. |
| 2005/0029514 A1 | 2/2005 | Moriya |
| 2005/0033656 A1 | 2/2005 | Wang et al. |
| 2005/0076372 A1 | 4/2005 | Moore et al. |
| 2005/0091107 A1 | 4/2005 | Blum |
| 2005/0094031 A1 | 5/2005 | Tecot et al. |
| 2005/0144164 A1 | 6/2005 | Gorak et al. |
| 2005/0234958 A1 | 10/2005 | Sipusic et al. |
| 2005/0246752 A1 | 11/2005 | Liwerant et al. |
| 2006/0009243 A1 | 1/2006 | Dahan et al. |
| 2006/0047779 A1 | 3/2006 | Deshpande |
| 2006/0087987 A1 | 4/2006 | Witt et al. |
| 2006/0089843 A1 | 4/2006 | Flather |
| 2006/0117356 A1 | 6/2006 | Jojic et al. |
| 2006/0136305 A1 | 6/2006 | Fitzsimmons et al. |
| 2006/0202191 A1 | 9/2006 | Gerlach et al. |
| 2006/0212794 A1 | 9/2006 | Evans et al. |
| 2006/0242016 A1 | 10/2006 | Chenard |
| 2006/0256133 A1 | 11/2006 | Rosenberg |
| 2006/0264209 A1 | 11/2006 | Atkinson et al. |
| 2006/0265657 A1 | 11/2006 | Gilley |
| 2006/0276266 A1 | 12/2006 | Sullivan |
| 2007/0003223 A1 | 1/2007 | Armstrong et al. |
| 2007/0005795 A1 | 1/2007 | Gonzalez |
| 2007/0030080 A1 | 2/2007 | Han et al. |
| 2007/0033531 A1 | 2/2007 | Marsh |
| 2007/0046687 A1 | 3/2007 | Soroushi et al. |
| 2007/0073553 A1 | 3/2007 | Flinn et al. |
| 2007/0087489 A1 | 4/2007 | Park et al. |
| 2007/0091093 A1 | 4/2007 | Li et al. |
| 2007/0091095 A1 | 4/2007 | Chen |
| 2007/0106646 A1 | 5/2007 | Stern et al. |
| 2007/0150360 A1 | 6/2007 | Getz |
| 2007/0157228 A1 | 7/2007 | Bayer et al. |
| 2007/0180461 A1 | 8/2007 | Hilton |
| 2007/0183430 A1 | 8/2007 | Asmussen |
| 2007/0204308 A1 | 8/2007 | Nicholas et al. |
| 2007/0239546 A1 | 10/2007 | Blum et al. |
| 2007/0241327 A1 | 10/2007 | Kim et al. |
| 2007/0242066 A1 | 10/2007 | Levy Rosenthal |
| 2007/0245243 A1 | 10/2007 | Lanza et al. |
| 2007/0250899 A1 | 10/2007 | Rhodes et al. |
| 2007/0250901 A1 | 10/2007 | McIntire et al. |
| 2007/0266399 A1 | 11/2007 | Sidi |
| 2007/0271149 A1 | 11/2007 | Siegel et al. |
| 2007/0288518 A1 | 12/2007 | Crigler et al. |
| 2007/0300263 A1 | 12/2007 | Barton et al. |
| 2007/0300280 A1 | 12/2007 | Turner et al. |
| 2008/0005999 A1 | 1/2008 | Pervan |
| 2008/0012010 A1 | 1/2008 | Myung-Seok et al. |
| 2008/0028047 A1 | 1/2008 | Girouard et al. |
| 2008/0066099 A1 | 3/2008 | Brodersen et al. |
| 2008/0066107 A1 | 3/2008 | Moonka et al. |
| 2008/0097843 A1 | 4/2008 | Menon et al. |
| 2008/0098425 A1 | 4/2008 | Welch |
| 2008/0109306 A1 | 5/2008 | Maigret et al. |
| 2008/0109844 A1 | 5/2008 | Baldeschwieler et al. |
| 2008/0114656 A1 | 5/2008 | Jersey et al. |
| 2008/0115161 A1 | 5/2008 | Kurzion |
| 2008/0126191 A1 | 5/2008 | Schiavi |
| 2008/0126226 A1 | 5/2008 | Popkiewicz et al. |
| 2008/0126949 A1 | 5/2008 | Sharma |
| 2008/0148283 A1 | 6/2008 | Allen et al. |
| 2008/0149921 A1 | 6/2008 | Choi et al. |
| 2008/0155590 A1 | 6/2008 | Soukup et al. |
| 2008/0162343 A1 | 7/2008 | Bedier |
| 2008/0163283 A1 | 7/2008 | Tan et al. |
| 2008/0177627 A1 | 7/2008 | Cefail |
| 2008/0177630 A1 | 7/2008 | Maghfourian et al. |
| 2008/0235085 A1 | 9/2008 | Kovinsky et al. |
| 2008/0250445 A1 | 10/2008 | Zigmond et al. |
| 2008/0255934 A1 | 10/2008 | Leventhal et al. |
| 2008/0263583 A1 | 10/2008 | Heath |
| 2008/0276266 A1 | 11/2008 | Huchital et al. |
| 2008/0276272 A1 | 11/2008 | Rajaraman et al. |
| 2008/0281685 A1 | 11/2008 | Jaffe et al. |
| 2008/0281689 A1 | 11/2008 | Blinnikka et al. |
| 2008/0294694 A1 | 11/2008 | Maghfourian et al. |
| 2008/0296568 A1 | 11/2008 | Ryu et al. |
| 2008/0306999 A1 | 12/2008 | Finger et al. |
| 2008/0307310 A1 | 12/2008 | Segal et al. |

(56) References Cited

U.S. PATENT DOCUMENTS

| | | |
|---|---|---|
| 2008/0319852 A1 | 12/2008 | Gardner et al. |
| 2008/0319856 A1 | 12/2008 | Zito et al. |
| 2009/0006191 A1 | 1/2009 | Arankalle et al. |
| 2009/0013347 A1 | 1/2009 | Ahanger et al. |
| 2009/0018904 A1 | 1/2009 | Shipman et al. |
| 2009/0031382 A1 | 1/2009 | Cope |
| 2009/0032007 A1 | 2/2009 | Satou |
| 2009/0032809 A1 | 2/2009 | Kim et al. |
| 2009/0043674 A1 | 2/2009 | Minsky et al. |
| 2009/0070206 A1 | 3/2009 | Sengamedu |
| 2009/0077598 A1 | 3/2009 | Watson et al. |
| 2009/0083815 A1* | 3/2009 | McMaster .......... H04N 7/17318 725/110 |
| 2009/0089146 A1 | 4/2009 | Teterin |
| 2009/0092374 A1 | 4/2009 | Kulas |
| 2009/0094339 A1 | 4/2009 | Allen et al. |
| 2009/0094555 A1 | 4/2009 | Viitala |
| 2009/0106104 A1 | 4/2009 | Upendran et al. |
| 2009/0119169 A1 | 5/2009 | Chandratillake et al. |
| 2009/0132349 A1 | 5/2009 | Berkley et al. |
| 2009/0148843 A1 | 6/2009 | Schulze-Koops et al. |
| 2009/0150947 A1 | 6/2009 | Soderstrom |
| 2009/0157500 A1 | 6/2009 | Ames et al. |
| 2009/0158322 A1 | 6/2009 | Cope et al. |
| 2009/0172793 A1 | 7/2009 | Newstadt et al. |
| 2009/0199230 A1 | 8/2009 | Kumar et al. |
| 2009/0210790 A1 | 8/2009 | Thomas |
| 2009/0222851 A1 | 9/2009 | Talmi |
| 2009/0248546 A1 | 10/2009 | Norris et al. |
| 2009/0249185 A1 | 10/2009 | Datar et al. |
| 2009/0259563 A1 | 10/2009 | Ruhnke et al. |
| 2009/0265255 A1 | 10/2009 | Jackson et al. |
| 2009/0274437 A1 | 11/2009 | Stiers et al. |
| 2009/0276805 A1 | 11/2009 | Andrews, II et al. |
| 2009/0320073 A1 | 12/2009 | Reisman |
| 2009/0328113 A1 | 12/2009 | van de Klashorst |
| 2010/0030578 A1 | 2/2010 | Siddique et al. |
| 2010/0114983 A1 | 5/2010 | Robert et al. |
| 2010/0131385 A1 | 5/2010 | Harrang et al. |
| 2010/0145795 A1 | 6/2010 | Haber et al. |
| 2010/0153831 A1 | 6/2010 | Beaton |
| 2010/0161425 A1 | 6/2010 | Sideman |
| 2010/0177122 A1 | 7/2010 | Netter et al. |
| 2010/0199182 A1 | 8/2010 | Lanza et al. |
| 2010/0223107 A1 | 9/2010 | Kim et al. |
| 2010/0247061 A1 | 9/2010 | Bennett et al. |
| 2010/0279766 A1 | 11/2010 | Pliska et al. |
| 2010/0283827 A1 | 11/2010 | Bustamente |
| 2010/0287580 A1 | 11/2010 | Harding et al. |
| 2010/0299616 A1 | 11/2010 | Chen et al. |
| 2010/0306805 A1 | 12/2010 | Neumeier et al. |
| 2010/0332329 A1 | 12/2010 | Roberts et al. |
| 2011/0001758 A1 | 1/2011 | Chalozin et al. |
| 2011/0004517 A1 | 1/2011 | Soto et al. |
| 2011/0016487 A1 | 1/2011 | Chalozin et al. |
| 2011/0022471 A1 | 1/2011 | Brueck et al. |
| 2011/0052144 A1 | 3/2011 | Abbas et al. |
| 2011/0071865 A1 | 3/2011 | Leeds et al. |
| 2011/0106879 A1 | 5/2011 | Sung et al. |
| 2011/0107363 A1 | 5/2011 | Sanghavi |
| 2011/0125594 A1 | 5/2011 | Brown et al. |
| 2011/0133176 A1 | 6/2011 | Lee et al. |
| 2011/0166944 A1 | 7/2011 | Tkachev |
| 2011/0173300 A1 | 7/2011 | Levy et al. |
| 2011/0191178 A1 | 8/2011 | Newberg et al. |
| 2011/0191809 A1 | 8/2011 | Briggs et al. |
| 2011/0231260 A1 | 9/2011 | Price |
| 2011/0238755 A1 | 9/2011 | Khan et al. |
| 2011/0251897 A1 | 10/2011 | Litvack et al. |
| 2011/0307397 A1 | 12/2011 | Benmbarek |
| 2012/0030704 A1 | 2/2012 | Schiller et al. |
| 2012/0079021 A1 | 3/2012 | Roman et al. |
| 2012/0158511 A1 | 6/2012 | Lucero et al. |
| 2012/0159541 A1 | 6/2012 | Carton et al. |
| 2012/0185355 A1 | 7/2012 | Kilroy |
| 2012/0192104 A1 | 7/2012 | Robbin et al. |
| 2012/0222064 A1 | 8/2012 | Geer, III et al. |
| 2012/0227060 A1 | 9/2012 | Allen et al. |
| 2012/0227074 A1 | 9/2012 | Hill et al. |
| 2012/0296738 A1 | 11/2012 | Leeder |
| 2012/0296782 A1 | 11/2012 | Tsai et al. |
| 2012/0304065 A1 | 11/2012 | Cai |
| 2012/0307152 A1 | 12/2012 | Zaslavsky et al. |
| 2013/0014137 A1 | 1/2013 | Bhatia et al. |
| 2013/0014155 A1 | 1/2013 | Clarke et al. |
| 2013/0054757 A1 | 2/2013 | Spitz et al. |
| 2013/0097023 A1 | 4/2013 | Yerli |
| 2013/0110608 A1 | 5/2013 | Cassidy et al. |
| 2013/0117131 A1 | 5/2013 | Robinson et al. |
| 2013/0144903 A1 | 6/2013 | Andrews, II et al. |
| 2013/0151352 A1 | 6/2013 | Tsai et al. |
| 2013/0152123 A1 | 6/2013 | Briggs et al. |
| 2013/0166382 A1 | 6/2013 | Cassidy et al. |
| 2013/0174007 A1 | 7/2013 | Demarco et al. |
| 2013/0183021 A1 | 7/2013 | Osman |
| 2013/0211891 A1 | 8/2013 | Daniel et al. |
| 2013/0212611 A1 | 8/2013 | Van Aacken et al. |
| 2013/0215116 A1 | 8/2013 | Siddique et al. |
| 2013/0218964 A1 | 8/2013 | Jakobson |
| 2013/0228615 A1 | 9/2013 | Gates et al. |
| 2013/0254018 A1 | 9/2013 | Rao |
| 2013/0290550 A1 | 10/2013 | Bangalore et al. |
| 2014/0006156 A1 | 1/2014 | Theophilis |
| 2014/0019860 A1 | 1/2014 | Sathish et al. |
| 2014/0032366 A1 | 1/2014 | Spitz et al. |
| 2014/0095330 A1 | 4/2014 | Briggs et al. |
| 2014/0101551 A1 | 4/2014 | Sherrets et al. |
| 2014/0115631 A1 | 4/2014 | Mak |
| 2014/0181208 A1 | 6/2014 | Robinson et al. |
| 2014/0208235 A1 | 7/2014 | Robinson et al. |
| 2014/0250211 A1 | 9/2014 | Spitz et al. |
| 2014/0254942 A1 | 9/2014 | Liu et al. |
| 2014/0282700 A1 | 9/2014 | Briggs et al. |
| 2014/0282724 A1 | 9/2014 | Chalozin et al. |
| 2014/0304730 A1 | 10/2014 | Lettau et al. |
| 2014/0359671 A1 | 12/2014 | Andrews, II et al. |
| 2015/0039468 A1 | 2/2015 | Spitz et al. |
| 2015/0073919 A1 | 3/2015 | Spitz et al. |
| 2015/0074710 A1 | 3/2015 | Spitz et al. |
| 2015/0074711 A1 | 3/2015 | Spitz et al. |
| 2015/0092111 A1 | 4/2015 | Spitz et al. |
| 2015/0095455 A1 | 4/2015 | Spitz et al. |
| 2015/0189355 A1 | 7/2015 | Korbecki |
| 2015/0264417 A1 | 9/2015 | Spitz et al. |
| 2016/0029070 A1 | 1/2016 | Briggs et al. |
| 2016/0029071 A1 | 1/2016 | Briggs et al. |
| 2016/0029072 A1 | 1/2016 | Briggs et al. |
| 2016/0029090 A1 | 1/2016 | Briggs et al. |

FOREIGN PATENT DOCUMENTS

| | | |
|---|---|---|
| CN | 101699505 | 4/2010 |
| EA | 011996 B1 | 6/2009 |
| RU | 2355043 C1 | 5/2009 |
| RU | 39738 U1 | 12/2009 |
| WO | WO 01/69364 | 9/2001 |
| WO | WO 01/91869 | 12/2001 |
| WO | WO 2005/036875 | 4/2005 |
| WO | WO 2006/062105 | 6/2006 |
| WO | WO 2008/016634 | 2/2008 |
| WO | WO 2009/012580 | 1/2009 |
| WO | WO 2009/137368 | 11/2009 |
| WO | WO 2011/149491 | 12/2011 |
| WO | WO 2013/033239 | 3/2013 |
| WO | WO 2013/192557 | 12/2013 |
| WO | WO 2015/038795 | 3/2015 |
| WO | WO 2015/038798 | 3/2015 |
| WO | WO 2015/038802 | 3/2015 |
| WO | WO 2015/048375 | 4/2015 |
| WO | WO 2015/048377 | 4/2015 |
| WO | WO 2015/054644 | 4/2015 |
| WO | WO 2015/131126 | 9/2015 |
| WO | WO 2015/138612 | 9/2015 |
| WO | WO 2015/013117 | 1/2016 |

(56) References Cited

FOREIGN PATENT DOCUMENTS

OTHER PUBLICATIONS

Decision to Refuse European Patent Application No. 10803672.4 and Minutes of the Oral Proceeding, dated Feb. 23, 2016.
Office Action for U.S. Appl. No. 12/363,713, mailed Oct. 3, 2011, 9 pages.
Office Action for U.S. Appl. No. 12/363,713, mailed Jun. 13, 2012, 13 pages.
First Office Action for Chinese Application No. 201080040436.3, dated Jul. 21, 2015, 32 pages.
Supplementary European Search Report for European Application No. 10803672.4, mailed Apr. 2, 2013, 4 pages.
Notification on Results of Estimation of Patentability of Invention for Russian Application No. 2012105917, dated Feb. 16, 2015, 7 pages.
Office Action for U.S. Appl. No. 12/787,505, mailed Apr. 5, 2012, 16 pages.
Office Action for U.S. Appl. No. 12/787,505, mailed Mar. 1, 2013, 10 pages.
Office Action for U.S. Appl. No. 12/787,505, mailed Mar. 18, 2014, 10 pages.
Office Action for U.S. Appl. No. 12/787,505, mailed Jul. 16, 2015, 14 pages.
Office Action for U.S. Appl. No. 12/787,505, mailed Nov. 23, 2015, 14 pages.
Office Action for U.S. Appl. No. 12/787,505, mailed Aug. 27, 2014, 12 pages.
Office Action for U.S. Appl. No. 12/787,505, mailed Sep. 23, 2013, 10 pages.
Office Action for U.S. Appl. No. 12/787,505, mailed Oct. 24, 2012, 9 pages.
International Search Report and Written Opinion for International Application No. PCT/US2010/057567, mailed Jun. 24, 2011.
Office Action for U.S. Appl. No. 13/605,892, mailed Jan. 18, 2013, 10 pages.
Office Action for U.S. Appl. No. 13/762,184, mailed Mar. 28, 2013, 8 pages.
Office Action for U.S. Appl. No. 14/042,477, mailed Apr. 10, 2014, 9 pages.
Office Action for U.S. Appl. No. 14/079,385, mailed Feb. 3, 2016, 14 pages.
Office Action for U.S. Appl. No. 14/079,385, mailed Mar. 3, 2015, 12 pages.
Office Action for U.S. Appl. No. 14/079,385, mailed Feb. 21, 2014, 10 pages.
Office Action for U.S. Appl. No. 14/079,385, mailed Jul. 1, 2015, 13 pages.
Office Action for U.S. Appl. No. 14/079,385, mailed Aug. 27, 2014, 12 pages.
Office Action for U.S. Appl. No. 14/091,219, mailed Apr. 11, 2014, 9 pages.
Office Action for U.S. Appl. No. 14/091,219, mailed Jul. 21, 2014, 11 pages.
Office Action for U.S. Appl. No. 14/292,423, mailed Jan. 9, 2015, 13 pages.
Office Action for U.S. Appl. No. 14/808,768, mailed Nov. 6, 2015, 8 pages.
Office Action for U.S. Appl. No. 14/808,789, mailed Nov. 5, 2015, 6 pages.
Office Action for U.S. Appl. No. 14/808,794, mailed Nov. 4, 2015, 6 pages.
Office Action for U.S. Appl. No. 14/808,831, mailed Nov. 9, 2015, 6 pages.
Office Action for U.S. Appl. No. 12/434,569, mailed May 4, 2012, 6 pages.
Office Action for U.S. Appl. No. 12/434,569, mailed Oct. 25, 2012, 9 pages.
Office Action for U.S. Appl. No. 12/434,569, mailed Mar. 15, 2013, 8 pages.
Office Action for U.S. Appl. No. 12/434,569, mailed Jul. 18, 2013, 9 pages.
Office Action for U.S. Appl. No. 12/434,569, mailed Nov. 19, 2013, 11 pages.
Office Action for U.S. Appl. No. 12/434,569, mailed Mar. 20, 2014, 10 pages.
Office Action for U.S. Appl. No. 12/434,569, mailed Oct. 2, 2014, 10 pages.
Office Action for U.S. Appl. No. 13/753,384, mailed Oct. 25, 2013, 14 pages.
Office Action for U.S. Appl. No. 13/753,384, mailed Jul. 9, 2014, 9 pages.
Office Action for U.S. Appl. No. 13/753,384, mailed Dec. 20, 2013, 10 pages.
Office Action for U.S. Appl. No. 13/753,384, mailed May 17, 2013, 9 pages.
Office Action for U.S. Appl. No. 14/461,570, mailed Oct. 7, 2015, 8 pages.
Office Action for U.S. Appl. No. 14/800,581, mailed Oct. 15, 2015, 5 pages.
Office Action for Australian Application No. 2012302021, dated Oct. 22, 2015, 3 pages.
Supplementary European Search Report for European Application No. 12828677.0, mailed Sep. 28, 2015, 7 pages.
Notice of Allowance for U.S. Appl. No. 13/598,443, mailed May 8, 2014, 8 pages.
International Search Report and Written Opinion for International Application No. PCT/US2012/052897, mailed Nov. 14, 2012.
Office Action for U.S. Appl. No. 13/923,089, mailed Aug. 20, 2014, 10 pages.
Office Action for U.S. Appl. No. 13/923,089, mailed Dec. 2, 2014, 5 pages.
International Search Report and Written Opinion for International Application No. PCT/US2013/047124, dated Jan. 10, 2014.
Office Action for U.S. Appl. No. 14/512,204, mailed Jul. 30, 2015, 21 pages.
Office Action for U.S. Appl. No. 14/512,204, mailed Jan. 6, 2015, 17 pages.
International Search Report and Written Opinion for International Application No. PCT/US2014/060150, dated Jan. 26, 2015, 6 pages.
Office Action for U.S. Appl. No. 14/484,047, mailed May 18, 2015, 9 pages.
Office Action for U.S. Appl. No. 14/484,047, mailed Dec. 18, 2014, 7 pages.
International Search Report and Written Opinion for International Application No. PCT/US2014/055233, dated Nov. 24, 2014.
Office Action for U.S. Appl. No. 14/484,065, mailed Jul. 17, 2015, 13 pages.
Office Action for U.S. Appl. No. 14/484,065, mailed Dec. 19, 2014, 7 pages.
International Search Report and Written Opinion for International Application No. PCT/US2014/055229, dated Dec. 16, 2014.
Office Action for U.S. Appl. No. 14/484,225, mailed May 21, 2015, 12 pages.
Office Action for U.S. Appl. No. 14/484,225, mailed Dec. 26, 2014, 7 pages.
International Search Report and Written Opinion for International Application No. PCT/US2014/055226, dated Dec. 16, 2014.
Office Action for U.S. Appl. No. 14/497,686, mailed Feb. 24, 2015, 13 pages.
International Search Report and Written Opinion for International Application No. PCT/US2014/057597, dated Jan. 9, 2015.
Office Action for U.S. Appl. No. 14/498,800, mailed Mar. 27, 2015, 18 pages.
Office Action for U.S. Appl. No. 14/498,800, mailed Sep. 25, 2015, 20 pages.
International Search Report and Written Opinion for International Application No. PCT/US2014/057595, dated Dec. 15, 2014.
Office Action for U.S. Appl. No. 14/633,986, mailed Sep. 3, 2015, 16 pages.
International Search Report and Written Opinion for International Application No. PCT/US2015/018140, dated Jun. 3, 2015, 9 pages.

(56) References Cited

OTHER PUBLICATIONS

International Search Report and Written Opinion for International Application No. PCT/US2014/019979, mailed Jun. 4, 2014, 12 pages.
Ried et al., "An Analysis of Anonymity in the Bitcoin System," http://arxiv.org/pdf/1107.4524.pdf, May 2, 2012, 29 pages.
"Akamai for Media & Entertainment," Akamai Technologies, Inc., 2007, 38 pages.
"ebd Web Video Player, Increase Online Video Ad Monetization," www.ebdsoft.tv, 2010, 2 pages.
"Content distributors can shopping-enable video content," www.web.archive.org, Apr. 27, 2007, 1 page.
Kaplan, D., "Delivery Agent lets you buy products in your favorite TV shows," www.web.archive.org, May 4, 2007, 4 pages.
"Shopisodes Enable You to Dress Like Your Favorite TV Character," www.web.archive.org, Oct. 26, 2007, 1 page.
Liebman, J., "Reality TV That's Social, Bravo!," www.web.archive.org, Dec. 22, 2008, 6 pages.
Wan, K. et al., "Advertising Insertion in Sports Webcasts," 2007, IEEE, p. 78-82.
Helft, M., "Google Aims to Make YouTube Profitable With Ads," The New York Times, Aug. 22, 2007, 3 pages.
Tomlinson, C., "Google Tries to Relive Past Glories by Making YouTube Pay for Itself," Birmingham Post, Sep. 4, 2007, 3 pages.
Skidgel, J., "Producing Flash CS3 Video, Techniques for Video Pros and Web Designers," 2007, 9 pages.
Krikke, J., "Streaming Video Transforms the Media Industry," IEEE, Jul./Aug. 2004, p. 6-12.
Mei, T. et al., "VideoSense—Towards Effective Online Video Advertising," Sep. 23-28, 2007, p. 1075-1084.
Van Vilet, H., "Where Television and Internet Meet .. New Experiences for Rich Media," Jan. 2002, 35 pages.
"IAB Announces Advertising Creative Guidelines for Online Broadband Video Commercials," Nov. 29, 2005, 4 pages.
"Digital Video In-Stream Ad Format Guidelines and Best Practices," Interactive Advertising Bureau, May 2008, 17 pages.
"Final Broadband Ad Creative Guidelines," Interactive Advertising Bureau, Standards & Guidelines, 4 pages.
"Broadband Ad Creative Guidelines," Dec. 31, 2006, 3 pages.
Rich Media Guidelines: Fall 2004, Dec. 31, 2006, 3 pages.
"About Rich Media Guidelines Compliance: In-Page Units," Jan. 7, 2007, 2 pages.
"About Rich Media Guidelines Compliance: Over-the-Page Units," Jan. 7, 2007, 2 pages.
"Digital Video Ad Serving Template (VAST), Version 2.0," iab., Nov. 2009, 18 pages (Redlined).
"Digital Video Ad Serving Template (VAST), Version 2.0," iab., Nov. 2009, 16 pages.
"Dart Motif for In-Stream Helps Publishers Improve Efficiency, Push the Envelope with Video Ad Effects and Offer Advertisers Trusted, Reliable Reporting Metrics," Nov. 6, 2006, 3 pages.
"DoubleClick Debuts Video Ad-Serving Solution," Nov. 6, 2006, 2 pages.
Gannes, L., "YouTube's New Inline Ads: Screenshots," May 11, 2007, 7 pages.
Rick, C., "A comprehensive list of online video ad types and formats, pros and cons," ReelSEO [online], Jun. 17, 2012, [retrieved from the internet on Feb. 24, 2016], 13 pages.
Chave, P., "Dpi platforms create ad insertion growth and revenue for broadcasters," TVTechnology [online], May 1, 2007, [retrieved from the internet on Feb. 24, 2016], 11 pages.
Balog, J., How to extract frames of a video, [online], Jun. 8, 2011, [retrieved from the internet on Nov. 17, 2015], 6 pages.
"Yellow vertical line in YouTube video timeline," Web Applications Stack Exchange [online], [retrieved from the internet on Nov. 17, 2015], 2 pages.
Cinsay, Inc. v. Joyus, Inc. and Brightcove, Inc., Case No. 3:13-cv-3628-K, "Defendants Joyus, Inc.'s and Brightcove, Inc.'s Opening Claim Construction Brief," filed in the United States District Court, Northern District of Texas, Dallas Division, on Jun. 19, 2014, 33 pages.
Cinsay, Inc. v. Joyus, Inc. and Brightcove, Inc., Case No. 3:13-cv-3628-K, "Index of Appendix in Support of Defendants Joyus, Inc.'s and Brightcove, Inc.'s Opening Claim Construction Brief," filed in the United States District Court, Northern District of Texas, Dallas Division, on Jun. 19, 2014, 52 pages.
Cinsay, Inc. v. Joyus, Inc. and Brightcove, Inc., Case No. 3:13-cv-3628-K, "Plaintiff Cinsay, Inc.'s Markman Brief in Support of Proposed Claim Constructions," filed in the United States District Court, Northern District of Texas, Dallas Division, on Jun. 19, 2014, 34 pages.
Cinsay, Inc. v. Joyus, Inc. and Brightcove, Inc., Case No. 3:13-cv-3628-K, "Appendix in Support of Plaintiff's Markman Brief in Support of Proposed Claim Constructions," filed in the United States District Court, Northern District of Texas, Dallas Division, on Jun. 19, 2014, 3 pages.
Cinsay, Inc. v. Joyus, Inc. and Brightcove, Inc., Case No. 3:13-cv-3628-K, "Exhibit 1, Declaration of Jennifer Beth Ingram, and Exhibits A-D to Plaintiff's Markman Brief in Support of Proposed Claim Constructions," filed in the United States District Court, Northern District of Texas, Dallas Division, on Jun. 19, 2014, 57 pages.
Cinsay, Inc. v. Joyus, Inc. and Brightcove, Inc., Case No. 3:13-cv-3628-K, "Exhibits E-J to Plaintiff's Markman Brief in Support of Proposed Claim Constructions," filed in the United States District Court, Northern District of Texas, Dallas Division, on Jun. 19, 2014, 22 pages.
Cinsay, Inc. v. Joyus, Inc. and Brightcove, Inc., Case No. 3:13-cv-3628-K, "Order Dismissing All Claims and Counterclaims," United States District Court, Northern District of Texas, Dallas Division, dated Aug. 14, 2014, 1 page.
Cinsay, Inc. v. Joyus, Inc., Case No. 3:13-cv-3628-K, "Amended Joint Claim Construction and Prehearing Statement," filed in the United States District Court, Northern District of Texas, Dallas Division, on Oct. 1, 2014, 6 pages.
Cinsay, Inc. v. Joyus, Inc., Case No. 3:13-cv-3628-K, "Exhibit A to Amended Joint Claim Construction and Prehearing Statement," filed in the United States District Court, Northern District of Texas, Dallas Division, on Oct. 1, 2014, 2 pages.
Cinsay, Inc. v. Joyus, Inc., Case No. 3:13-cv-3628-K, Exhibit B to Amended Joint Claim Construction and Prehearing Statement, filed in the United States District Court, Northern District of Texas, Dallas Division, on Oct. 1, 2014, 8 pages.
Cinsay, Inc. v. Joyus, Inc., Case No. 3:13-cv-3628-K, "Defendant Joyus, Inc.'s Motion for Judgment on the Pleadings," filed in the United States District Court, Northern District of Texas, Dallas Division, on Jan. 26, 2015, 24 pages.
Cinsay, Inc. v. Joyus, Inc., Case No. 3:13-cv-3628-K, "Plaintiff Cinsay, Inc.'s Response to Defendant Joyus, Inc.'s Motion for Judgment on the Pleadings," filed in the United States District Court, Northern District of Texas, Dallas Division, on Feb. 24, 2015, 23 pages.
Cinsay, Inc. v. Joyus, Inc., Case No. 3:13-cv-3628-K, "Appendix in Support of Plaintiff's Response to Defendant's Motion for Judgment on the Pleadings," filed in the United States District Court, Northern District of Texas, Dallas Division, on Feb. 24, 2015, 2 pages.
Cinsay, Inc. v. Joyus, Inc., Case No. 3:13-cv-3628-K, "Exhibit A to Plaintiff's Response to Defendant's Motion for Judgment on the Pleadings," filed in the United States District Court, Northern District of Texas, Dallas Division, on Feb. 24, 2015, 14 pages.
Cinsay, Inc. v. Joyus, Inc., Case No. 3:13-cv-3628-K, "Exhibit B to Plaintiff's Response to Defendant's Motion for Judgment on the Pleadings," filed in the United States District Court, Northern District of Texas, Dallas Division, on Feb. 24, 2015, 12 pages.
Cinsay, Inc. v. Joyus, Inc., Case No. 3:13-cv-3628-K, "Exhibit C to Plaintiff's Response to Defendant's Motion for Judgment on the Pleadings," filed in the United States District Court, Northern District of Texas, Dallas Division, on Feb. 24, 2015, 13 pages.
Cinsay, Inc. v. Joyus, Inc., Case No. 3:13-cv-3628-K, "Markman Memorandum Opinion and Order," United States District Court, Northern District of Texas, Dallas Division, dated Mar. 4, 2015, 38 pages.

(56) References Cited

OTHER PUBLICATIONS

Cinsay, Inc. v. Joyus, Inc., Case No. 3:13-cv-3628-K, "Order of Dismissal Without Prejudice," dated Apr. 7, 2015, and "Order Denying Defendant's Motion for Judgment on the Pleadings," dated Mar. 25, 2015, United States District Court, Northern District of Texas, Dallas Division, 2 pages.

* cited by examiner

INTERACTIVE PRODUCT PLACEMENT SYSTEM AND METHOD THEREFOR

CROSS-REFERENCE TO RELATED APPLICATIONS

This application is a continuation of U.S. patent application Ser. No. 14/292,423 filed on May 30, 2014 and entitled "INTERACTIVE PRODUCT PLACEMENT SYSTEM AND METHOD THEREFOR," which is a continuation of U.S. patent application Ser. No. 14/042,477 filed on Sep. 30, 2013 (now U.S. Pat. No. 8,782,690), which is a continuation of U.S. patent application Ser. No. 13/762,184 filed Feb. 7, 2013 (now U.S. Pat. No. 8,549,555), which is a continuation of U.S. patent application Ser. No. 13/605,892 filed on Sep. 6, 2012 (now U.S. Pat. No. 8,533,753), which is a continuation of U.S. patent application Ser. No. 12/363,713 filed on Jan. 30, 2009 (now U.S. Pat. No. 8,312,486), which claims the benefit of U.S. Provisional Patent Application No. 61/024,829 filed on Jan. 30, 2008. This application hereby claims the benefit of and/or priority to each of said respective applications (14/292,423; 14/042,477; 13/762,184; 13/605,892; 12/363,713; and 61/024,829) and hereby incorporates them by reference as if fully set forth herein.

TECHNICAL FIELD

The invention relates generally to interactive video broadcasting, and, more particularly, to placement of products in video broadcast for interactive purchase.

BACKGROUND

It is well-known that video may be broadcast or provided through a number of media, such as television, the Internet, DVD, and the like. To finance such video broadcast, commercial advertisements are often placed in the video. Commercials, however, require that the video be momentarily interrupted while the commercial is displayed. Not only is that annoying to viewers, but modern technology has developed digital video recorders (DVR's) that allow video programs to be pre-recorded, and when viewed, to fast-forward through commercials, thereby defeating the effectiveness and, hence, value of commercials. When commercials are de-valued, costs are not adequately covered, and as a result, broadcast service quality suffers. In many cases, costs are made up by charging viewers for the video service.

Therefore, what is needed is a system and method for advertising commercial products in such a way that they are not annoying and do not interrupt a video production, prompting a user fast-forward through them.

SUMMARY

The present invention, accordingly, provides a method for presenting advertisements for commercial products in video productions, whereby the commercial product is placed in the video production as an element of the video production. A viewer is enabled to interact with the video production to select the product. Information is displayed about the selected product; and the viewer is enabled to purchase the selected product.

More specifically, the invention comprises a web-based rich media software application allowing non-technical end-users the ability to easily create full frame interactive media overlays into the video production which has been encoded with pre-defined cue points that request immersive full motion video interactive overlay elements from an ad-server. The cue points are utilized to trigger pre-defined advertising events stored and indexed with metadata in an ad server or other database. By way of example, an advertising event may include the extraction of a single video frame or a series of frames of the encoded video production, which in turn becomes the interactive advertisement that is triggered by the pre-set cue point and presented to the user as a seamless advertising/entertainment experience.

Once the cue point triggers an event, the system calls the specific advertisement into the video player and seamlessly overlays the initial video production with the enhanced interactive product ads. The ad is displayed for a predetermined life cycle, such as 5-10 seconds. Once the life cycle of the ad expires, or the ad is clicked or presented to the end user, the advertisement will destroy itself, leaving the viewer with the impression that there was never a break in the viewing experience.

In conjunction with the integrated overlay advertisements, the process of the invention is supplemented with an information and product integrated timeline residing under the video production. At the triggered cue point, watermarked icons/logos appear under the video production. Users can interact with the icons to garner more information about a particular character, location, or advertisers at a specific point in the feature presentation, employing the same aforementioned calls.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the Internet, HTTP, XML, PHP, FLV, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
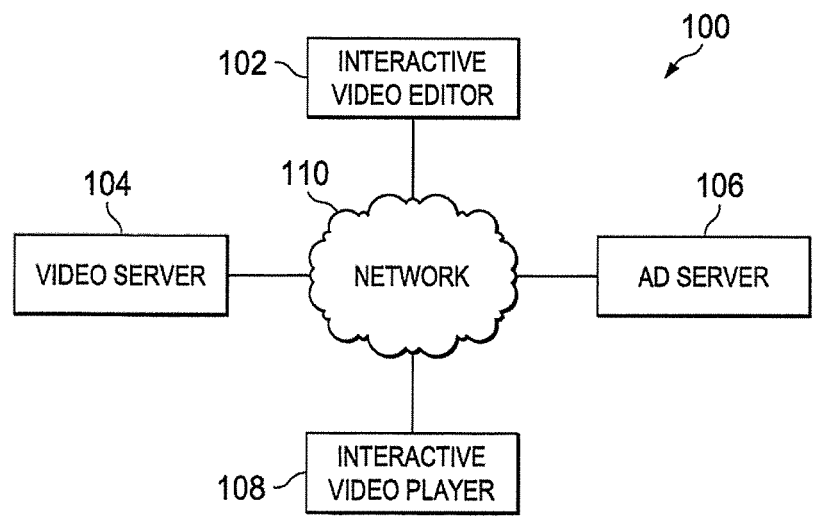
FIG. 1 is a high level block diagram of an interactive product placement system embodying features of the present invention.

Referring to FIG. 1 of the drawings, the reference numeral 100 generally designates an interactive product placement system embodying features of the present invention. The system 100 includes a video server 104 and an ad (i.e., "advertisement") server 106 coupled together via a communication information network effective for video streaming, such as the Internet, 110. An interactive video editor 102 is coupled via the Internet 110 to the video server 104 and ad server 106 for creating immersive interactive advertisements in conjunction with video productions displayed by the video server. An interactive video player 108 is coupled via the Internet 110 to the video server 104 and ad server 106 for displaying video productions from the video server 104 and ads from the ad server 106 in accordance with principles of the present invention.

Figure 3:
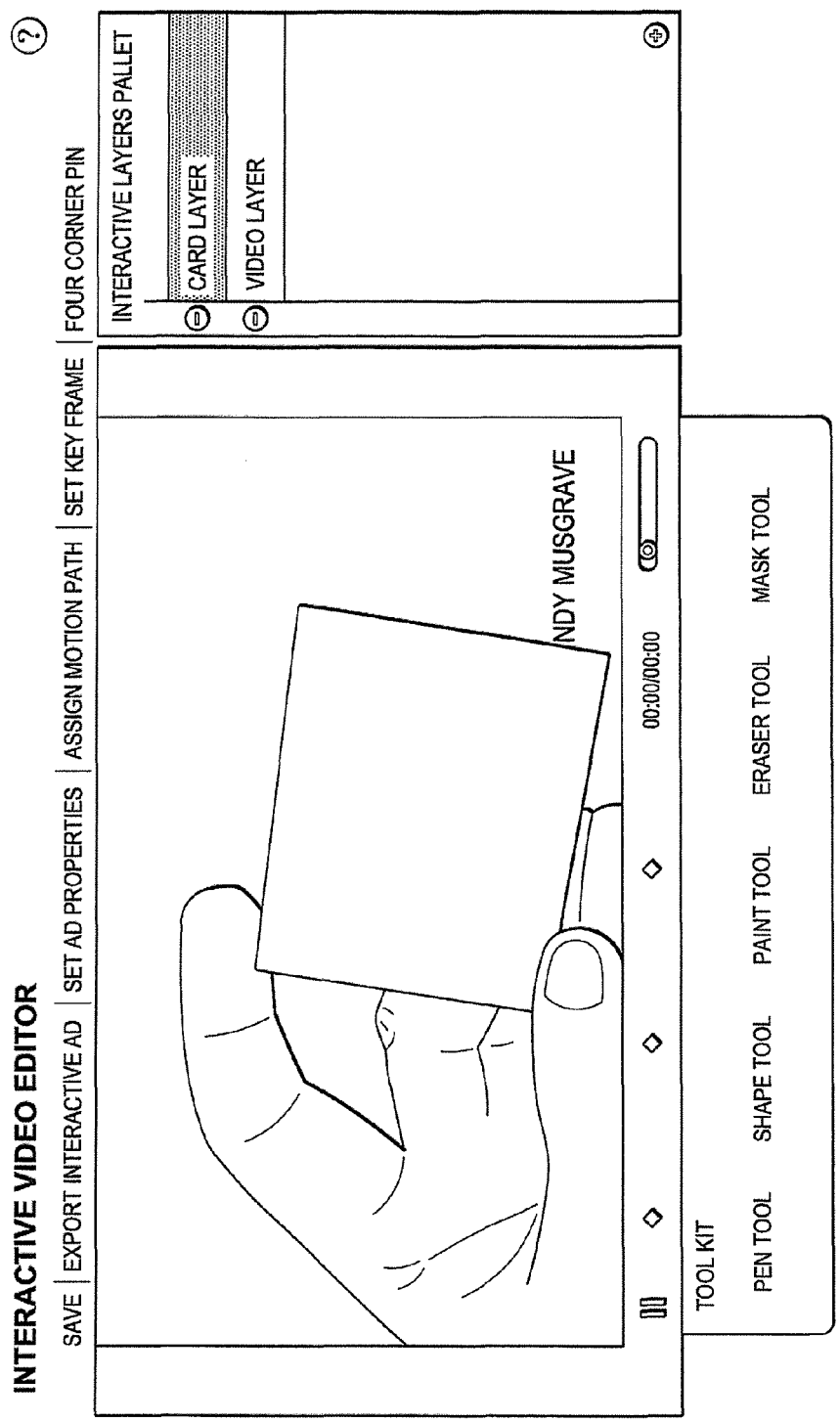
FIG. 3 exemplifies an application of an interactive video editor embodying features of the present invention.

FIG. 3 exemplifies an application of the interactive video editor 102 for enabling non-technical ad representatives to create an immersive interactive advertising experience for users. The editor 102 defines the properties, interactive elements, visuals, and motion of the ad element stored in metadata and XML format and packaged with the ad file. The editor 102 is a rich media application comprising tools, a user interface, and backend connections to the ad server 106. The following lists, by way of example and not limitation, some preferred features of the editor 102:

File: Open
Save: Save an iteration of video project file.
Export: Export in all applicable compiled final production ready formats.

Figure 4:
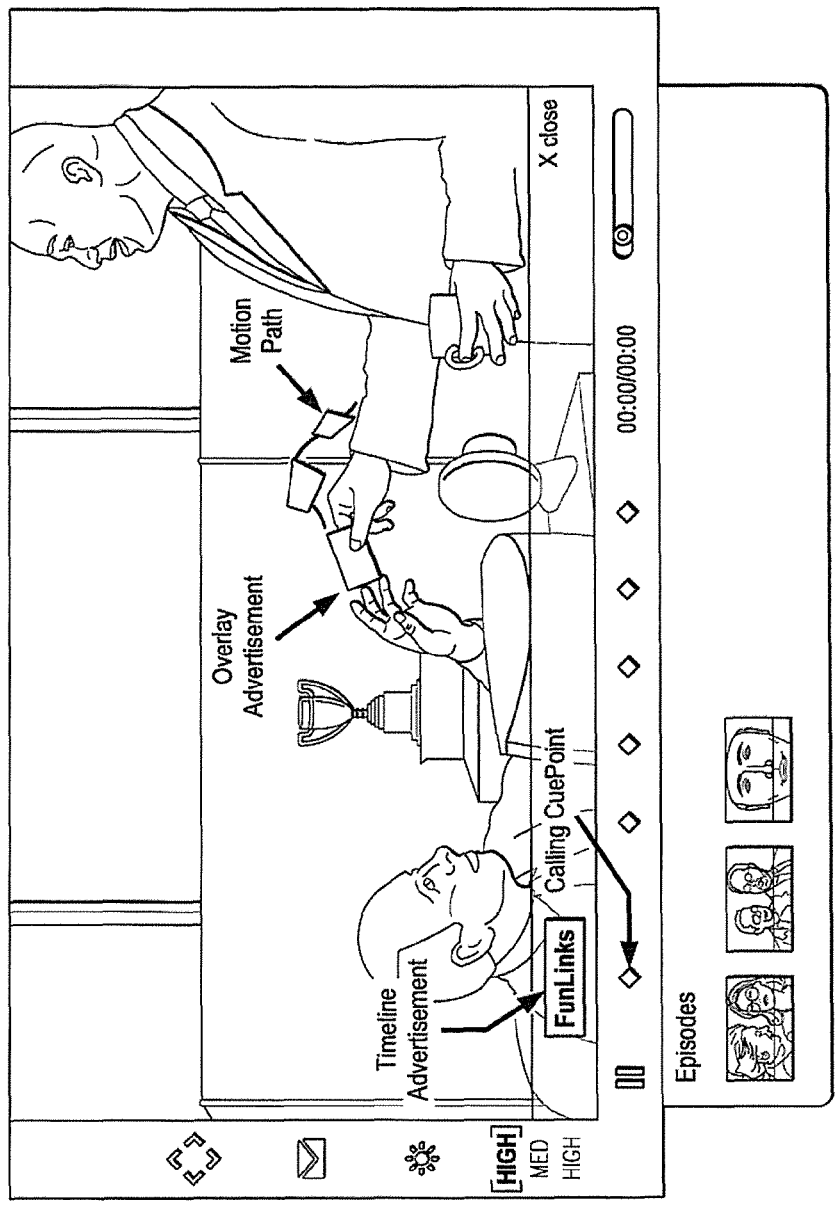
FIG. 4 exemplifies an application of an interactive video player embodying features of the present invention.

FIG. 4 exemplifies an application of the interactive video player 108 configured with the capabilities to read, display, and interact with code supplied by the corresponding application of the interactive video editor 102. The player 108 is a rich media application comprising tools, a user interface, and backend connections to the ad server 106.

As shown in FIG. 4, the video player 108 advertises a card in an overlay as it moves along a motion path. Also shown are an ad icon/logo for the card in a Timeline under the video display, and under the ad icon/logo, a calling cue point corresponding to a respective icon/logo above it. Optionally, under the calling cue points are episodes of the video production being watched. While the timeline is shown positioned beneath the video production, it may be positioned along the top, left, or right margins of the video production.

Figure 2:
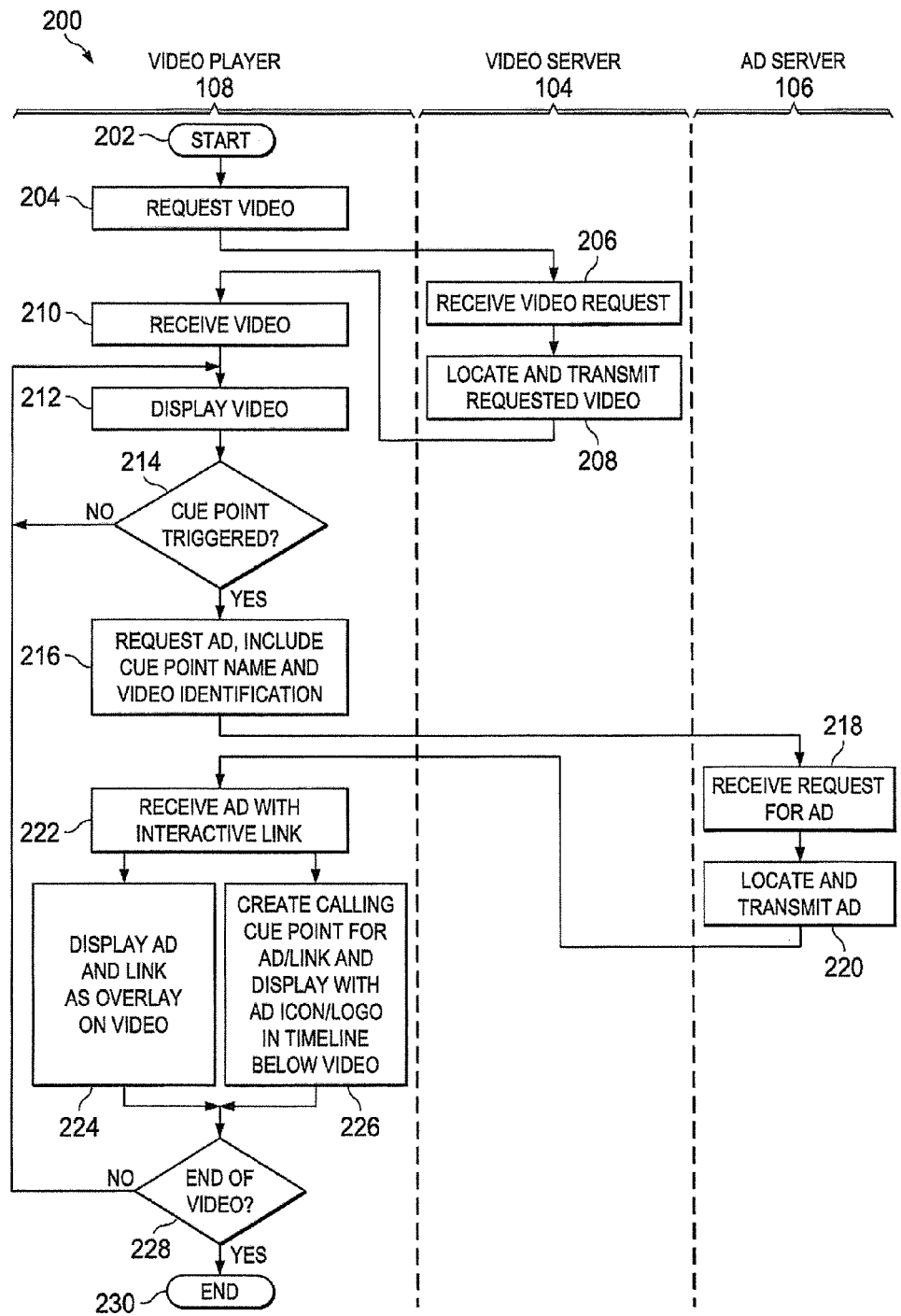
FIG. 2 exemplifies a flow chart illustrating control logic for implementing features of the system of FIG. 1.

FIG. 2 is a flow chart exemplifying steps in the operation of the invention. In step 202 operation begins, and in step 204 a request is generated by the video player 108 (per input from a user) for a video production and transmitted to the video server 104. In step 206, the video server 104 receives the request for a video production and, in step 208, the video server 104 locates the video production and transmits it to the video player 108. In step 212, the video player 108 begins playing the video production until a cue point is triggered in step 214. Upon triggering the cue point, execution proceeds to step 216 wherein the video player generates and transmits to the ad server 106 a request via HTTP POST requests for an ad, and includes with the request a cue point name and video ID into which the ad will be placed. The following exemplifies a request generated at step 216:

```
FLVPlayback.addEventListener(Video.CuePoint, function( ) {
    Var request = new
URLRequest("filename.php?func=advertisment&movie_id="+movie_id+"&cue_point="
+ this.cuePointName);
}
```

Properties: Set campaign name, lifespan and essential metadata ad formats.
Assign Path: Create guideline to animate overlay object end to end over.
Set Key: Assign animation key frame.
Four Corner Pin: Pin vector points to set start and end frames over underlying video production. Corner Pin effect distorts an image by repositioning each of its four corners. Use it to stretch, shrink, skew, or twist an image or to simulate perspective or movement that pivots from the edge of a layer The interactive video editor 102 also enables layers to be added to the video production. More specifically, an overlay element allows users to see an underlying video preview. The first layer on the bottom forms a base layer, and anything layered on top of that at least partially obscures the layers underneath it.

Still further, the interactive video editor 102 includes a tool kit, comprising the following:
Pen: freeform drawing tool used to define shape
Shape: Set of predefined shapes to use as interactive element
Paint: Brush tool allowing more freeform element creation
Erase: Remove excess erase tool allows you to remove portions of shapes or lines with precision. You can change the size and shape of the eraser as well as the portions of any shape you want to erase by adjusting the options In step 218, the ad server 106 receives the ad request and, in step 220, the ad server 106 locates the requested ad and transmits the ad to the video player 108. The ad requests are made form the player application via HTTP POST requests. The response from the ad server or other database will be a small XML that gives the path of the ad, length, and any other information that's related to the ad. The player reacts to events signaled by the cue points request and will execute actions defined inside the event trigger instructing the player with the ad parameters, e.g., kind of ad file requested, the action to take, e.g., pause, lifespan, effect, specifics coordinates of the over-laid ad, and the like, as well as any other custom defined configurations.

The following exemplifies simple cue point metadata, which is generated by the video editor 102 and stored with the advertisement:

| TIME | CUE POINT NAME | ACTION | DURATION | URL PATH |
|---|---|---|---|---|
| 1:54.02 | soda_can | Fade In | 10 sec. | http://yoururl.com/ad |
| 2:02.06 | pizza_box | Motion Path | 10 sec. | http://yoururl.com/ad |
| 9:02.04 | sneakers | Glow | 5 sec. | http://yoururl.com/ad |

In step 222, the video player receives the ad with an interactive link which a user/viewer may select and click on to obtain further information about the product being advertised, and optionally purchase same. The ad is then displayed as either or both an ad with the link as an overlay on the video production in step 224, or in step 226 as a calling cue point for the ad and link in an icon or logo in a timeline below the video production. In step 224, the ad is displayed for the duration indicated in the cue point data, as exemplified above. The icon or logo in the timeline of step 226 may remain in the timeline as long as space permits, that is, until space is needed for a icon or logo of a subsequent icon or logo.

In step 228, a determination is made whether the video production is complete. If the video production is not complete, execution returns to step 212; otherwise, execution is terminated as step 230.

Figure 5:
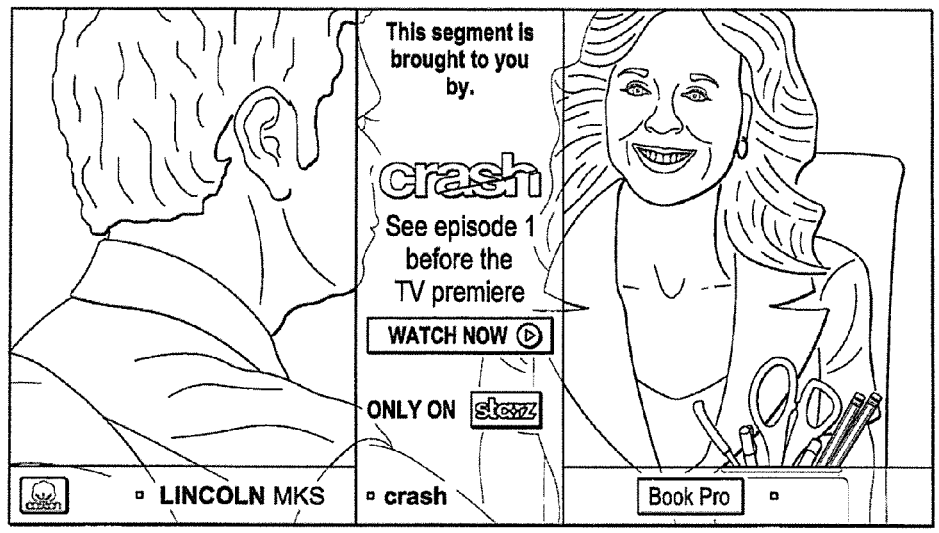
FIG. 5 exemplifies a product placement timeline embodying features of the present invention.
Figure 6:
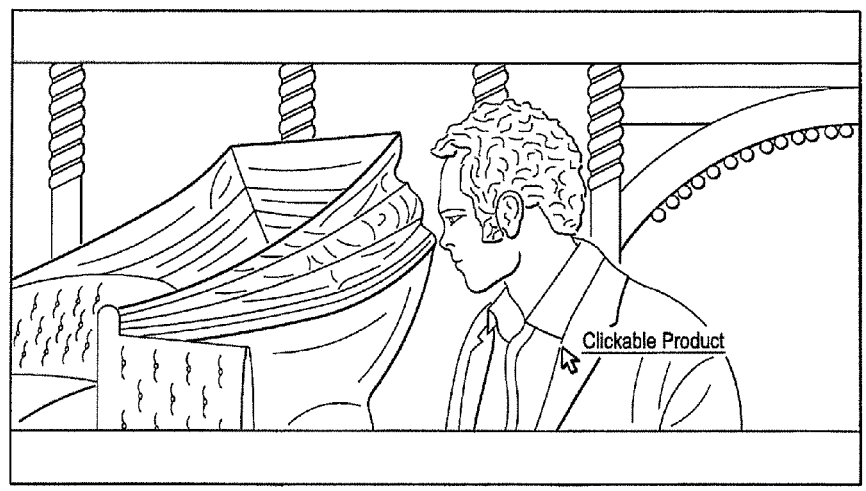
FIG. 6 exemplifies an interactive product placement embodying features of the present invention.

FIGS. 5 and 6 provide additional visual examples of interactive overlay and timeline ads, in which the video player 108 seeks cue points set in the video content triggering an ad event requesting either a timeline advertisement or an embedded live overlay advertisement. More specifically, FIG. 5 exemplifies how timeline information and advertisement offers directly correspond to cue points inside specific video content assets. FIG. 6 exemplifies how cue points trigger pre-defined advertising events stored and indexed with metadata in the ad server or other database. An example of the event may include the extraction of a single video frame or a series of frames of a video production, which in turn becomes the interactive advertisement that is laid over the video production to create a seamless interactive clickable video ad. As shown in FIG. 6, the product being advertised is highlight via rotoscoping, and additional information may be obtained about by clicking on the product.

By the use of the present invention, an improved method is provided for advertising products by interactively placing them either in a timeline or embedding them in a live overlay on a video production.

It is understood that the present invention may take many forms and embodiments. Accordingly, several variations may be made in the foregoing without departing from the spirit or the scope of the invention. For example, the compositing of elements otherwise non-existing into the finished advertising product or filming green screen products and services into the production to later composite via the video editing application. Means for interconnecting components of the system may be achieved other than via the Internet, such as via fiber optic or cable network or satellite. The video stream may be supplied by alternative means incorporating, for example, DVD technology.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method of advertising, the method comprising:
   transmitting code configured to generate a user interface for a video that displays one or more products or services, wherein the user interface is configured to:
   display an extracted single frame or series of frames from the video in an overlay over the video during a display of the single frame or series of frames in the video under the overlay such that the extracted single frame or series of frames in the overlay at least partially obscures the single frame or series of frames in the video under the overlay;
   display one or more interactive components in the overlay during the display of the extracted single frame or series of frames, wherein the one or more interactive components is related to the one or more products or services; and
   allow a user to retrieve further information not previously displayed about the one or more products or services.

2. The method of claim 1, wherein the one or more interactive components are displayable selectively.

3. The method of claim 1, wherein the one or more interactive components are displayable selectively and the user interface is further configured to selectively display the one or more interactive components upon triggering of a cue point.

4. The method of claim 1, wherein the user interface is configured to display the one or more interactive components as one or more partially transparent interactive components.

5. The method of claim 1, wherein the user interface is configured to display at least some of the further information over the video.

6. The method of claim 1, wherein the overlay is configured to be transparent in portions to permit a display of non-extracted frames of the video.

7. The method of claim 1, wherein the user interface is further configured to display a timeline associated with the video.

8. The method of claim 1, wherein the further information is configured to facilitate a transaction.

9. The method of claim 1, wherein the further information is configured to facilitate a transaction and the user interface is further confiaured to submit transaction information to a remote server.

10. The method of claim 1, wherein the user interface is further configured to:
    request the one or more interactive components from a first remote server based on instructions received from the first remote server or a second remote server.

11. A non-transitory computer-readable medium comprising instructions, the instructions when executed by at least one computer processor causing the at least one computer processor to:
    generate a user interface for a video that displays one or more products or services, the user interface configured to:
    display an extracted single frame or series of frames from the video in an overlay during playback of the video behind the overlay such that the extracted single frame or series of frames in the overlay at least partially obscures a single frame or series of frames in the video during playback of the video behind the overlay;
    display one or more interactive tools in the overlay during the display of the extracted single frame or series of frames, wherein at least one of the one or more interactive tools is related to the one or more products or services;
    receive a user request for further information, the further information not previously displayed about the one or more products or services during playback to the user; and
    send a request for further information based on the user request for further information.

12. The non-transitory computer-readable medium of claim 11, wherein the user interface is configured to display at least one of the one or more interactive tools selectively.

13. The non-transitory computer-readable medium of claim 11, wherein the user interface is configured to display an extracted single frame or series of frames from the video in an overlay during playback of the video in response to user interaction with a visual timeline associated with the video.

14. The non-transitory computer-readable medium of claim 11, wherein the user interface is configured to display at least one of the one or more interactive tools upon triggering of a cue point.

15. The non-transitory computer-readable medium of claim 11, wherein the user interface is further configured to display a visual timeline for the video.

16. The non-transitory computer-readable medium of claim 11, wherein the user interface is further configured to display a visual timeline for the video, and display an extracted single frame or series of frames from the video in an overlay based on user interaction with the visual timeline for the video.

17. The non-transitory computer-readable medium of claim 11, wherein the user interface is further configured to display a visual timeline for the video, the visual timeline including at least one visual representation of a cue point, the user interface configured to display at least one of the one or more interactive tools upon triggering of the cue point during playback of the video.

18. The non-transitory computer-readable medium of claim 11, wherein the user interface is configured to display at least one of the one or more interactive tools as partially transparent.

19. The non-transitory computer-readable medium of claim 11, wherein the user interface is configured to display at least some of the further information over the video.

20. The non-transitory computer-readable medium of claim 11, wherein the overlay is transparent in portions.

21. The non-transitory computer-readable medium of claim 11, wherein at least one of the one or more interactive tools is an advertisement.

22. The non-transitory computer-readable medium of claim 11, wherein at least one of the one or more interactive tools is configured to receive the user request for further information.

23. The non-transitory computer-readable medium of claim 11, wherein the further information is configured to initiate a transaction.

24. The non-transitory computer-readable medium of claim 11, wherein the user interface is further configured to: submit user information to a remote server.

25. The non-transitory computer-readable medium of claim 11, wherein the user interface is further configured to: request at least one of the one or more interactive tools from a first remote server according to instructions received from the first remote server or a second remote server.

* * * * *